(12) United States Patent
Smith et al.

(10) Patent No.: US 6,633,448 B1
(45) Date of Patent: Oct. 14, 2003

(54) DISK DATA STORAGE DEVICE HAVING IMPROVED TOLERANCE FOR STRESSFUL ENVIRONMENTS

(75) Inventors: Gordon James Smith, Rochester, MN (US); George Willard Van Leeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 09/656,107

(22) Filed: Sep. 6, 2000

(51) Int. Cl.[7] ............................................... G11B 19/02
(52) U.S. Cl. ........................................................ 360/69
(58) Field of Search ............................ 360/73.01, 73.03, 360/99.08, 69

(56) References Cited

U.S. PATENT DOCUMENTS

| | | | |
|---|---|---|---|
| 4,786,995 A | * 11/1988 | Stupeck et al. | ............... 360/75 |
| 5,157,566 A | * 10/1992 | Hishikawa et al. | ...... 360/99.08 |
| 6,166,874 A | * 12/2000 | Kim | ............................ 360/75 |

* cited by examiner

Primary Examiner—David Hudspeth
Assistant Examiner—Mitchell Slavitt
(74) Attorney, Agent, or Firm—Roy W. Truelson

(57) ABSTRACT

A disk and spindle motor assembly of a rotating disk drive is constrained from freely rotating when not in use to reduce fretting of the spindle assembly bearings in the presence of vibration. Preferably, a small electric current is driven through at least one of the spindle motor drive coils to hold the spindle assembly in a fixed angular position while the disk drive is not in use. The spindle motor is preferably a brushless DC motor comprising a multi-phase electrically driven stator and a permanent magnet rotor. Drive transistors normally drive the different phases under control of a processor. To constrain the drive, at least one of the drive transistors for a phase is activated. The rotor is preferably rotated periodically to a different angular position by driving a different phase of the stator. The rotor is alternatively constrained by mechanical means. The exemplary environment is an on-board motor vehicle application.

17 Claims, 5 Drawing Sheets

DISK DATA STORAGE DEVICE HAVING IMPROVED TOLERANCE FOR STRESSFUL ENVIRONMENTS

FIELD OF THE INVENTION

The present invention relates to rotating disk data storage devices, and in particular, to improving the tolerance of such data storage devices to vibration and other environmental stresses.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

Rotating magnetic disk drives were originally installed in so-called mainframe computing environments, which typically maintained a very controlled environment. I.e., due to the complexity and sensitivity of the various computer system components, temperature, humidity and other factors were maintained within a narrow range. However, as computing machinery has become more ubiquitous, it has been necessary to design components which will tolerate a wider range of environments. Thus, disk drive storage devices have progressively been designed for use in desktop personal computers, and eventually in laptop and other portable devices.

Given the advantages of rotating magnetic disk drives, it would be desirable to use such devices in an even greater range of applications. One potential area of application is in on-board data storage permanently installed in an automobile.

As is well known, modem automobiles are incorporating ever greater electronic capabilities. A modern automobile typically contains an on-board processor, on-board memory in the form of semiconductor memory, and various I/O devices such as sensors, gauges, control mechanisms, warning systems, and the like. Thus, while it is not always recognized as such, a modem automobile contains all the components which define a basic computer system. It would be desirable to use this on-board computer system for an even greater range of tasks than is typical today. These tasks may be related to the function of the automobile itself, or may simply be tasks for the convenience of the driver or passengers, such as providing entertainment, news, or other information.

When the on-board computing system of a typical automobile is compared with that of a desktop computer, one glaring deficiency of the typical automotive computing system is data storage. A typical desktop system contains one or more rotating magnetic disk drive storage devices, capable of storing massive amounts of data. The automotive system typically does not, and is thus generally used for tasks which do not require this magnitude of data storage. The incorporation of disk drive storage in the on-board systems of automobiles would open up a new range of capabilities for such systems.

Although cost is a potential concern, the primary concern with incorporating magnetic disk drive storage devices in automotive systems appears to be the ability of such drives to operate satisfactorily in an automotive environment. Such an environment may involve exposure to temperature extremes, vibration, shock, noxious gases, and other environmental stresses which are not present in typical desktop, or even laptop, installations.

Therefore there is a need for modifications to the design of disk drive storage devices which enhance the ability of such devices to operate in severe environmental conditions, particularly, the conditions experienced in a motor vehicle installation.

SUMMARY OF THE INVENTION

In accordance with the present invention, a disk and spindle motor assembly of a rotating disk drive data storage device is constrained from freely rotating when not in use. Constraining free rotation reduces fretting of the spindle assembly bearings in the presence of vibration.

In the preferred embodiment, the disk drive is a rotating rigid magnetic drive of a type having a head load/unload mechanism, which typically leaves the disks free to rotate when the drive is powered down and the heads are unloaded.

Preferably, a small electric current is driven through at least one of the spindle motor drive coils to hold the spindle assembly in a fixed angular position while the disk drive is not in use. The spindle motor is a brushless DC motor, in which the stator comprises multiple electrical windings each associated with a respective phase, and the rotor comprises permanent magnets which respond to magnetic fields generated by the stator. Preferably, a conventional three phase design is used, each phase being driven by a separate drive transistor or transistors. Under normal operating conditions, these transistors are activated in sequence under control of a processor. When the drive is to be constrained, at least one of the drive transistors for a phase is activated. Preferably, fewer than all, and possibly only one, of the drivers is activated at any one time. The amount of current driving the coil will vary with the disk drive design and the force required to hold the spindle motor in place. In order to avoid degrading conditions which may be associated with holding the spindle assembly at any one position over a long period of time, the assembly is preferably rotated periodically to a different angular position by driving a different phase of the stator.

In the preferred embodiment, the spindle motor is not driven at all times when not in use. Instead, the drive may be in an "off" state in which no constraining force is applied. The disk detects a potential vibration condition, and activates one of the drive transistors to hold the spindle assembly in place only when required. Detection of a vibration condition may be achieved with a physical vibration sensor which senses actual vibration, or may be a response to an event which is likely to cause vibration, such as the ignition switch of an automobile being turned on. In this manner, for example, a disk drive within a car which is parked without the motor running might not need vibration protection, while the sensor will activate a drive transistor when the motor is running.

In an alternative embodiment, disk constraining may be achieved by mechanical means employing a mechanical braking arm or the like.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

OVERVIEW

Figure 1:
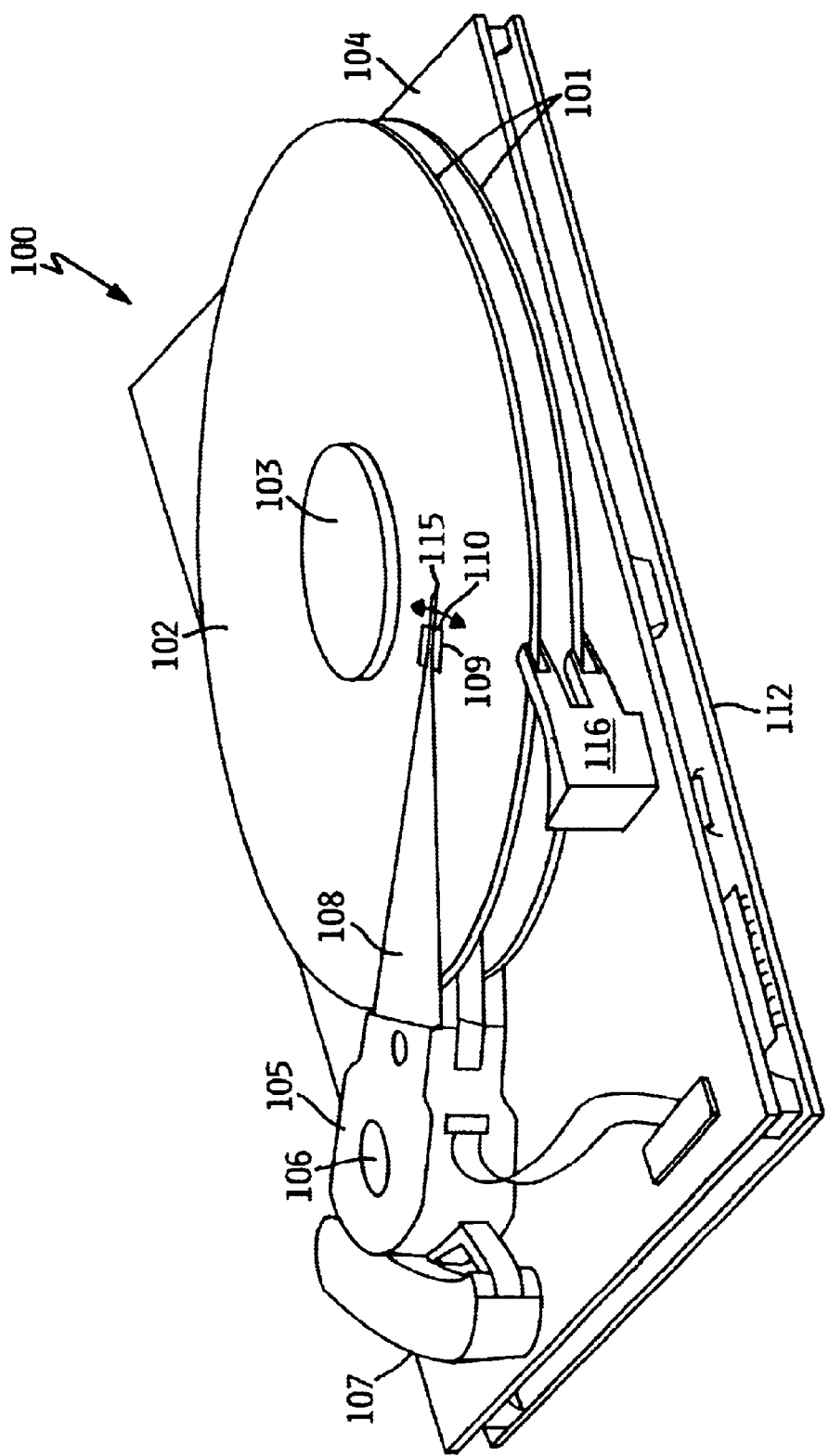
FIG. 1 is a simplified representation of a rotating magnetic disk drive storage device, for use in accordance with the preferred embodiment of the present invention.

A rotating rigid magnetic disk drive typically contains one or more smooth, flat disks which are permanently attached to a common spindle or hub. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk is formed of a solid disk-shaped base or substrate, having a hole in the center for the spindle. The substrate is commonly aluminum, although glass, ceramic, plastic other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electro-magnetic motor on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electro-magnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element.

The suspensions actually apply a force to the transducer heads in a direction into the disk surface. The aerodynamic characteristics of the slider counter this force, and enable the slider to fly above the disk surface at the appropriate distance for data access. However, if the disk is not spinning, no aerodynamic force is applied, and the heads will come to rest on the surface of the disk. In many older disk drive designs, the heads are parked on the disk surface when the disk is stopped, often in a special area called a "landing zone". In many modern disk drives, particularly in portable devices, the heads are "unloaded" when the disk drive is not in operation, meaning that the heads are mechanically lifted away from the disk surface so that there will be no head/disk contact even if the spindle is not spinning (and no aerodynamic lifting force is applied to the heads). Unloading the heads when the spindle motor is stopped helps to prevent damage to the heads and/or disk surface in the event of shock, and makes it easier to start the disk spindle assembly spinning when the drive is restarted.

In a disk drive having a head unload mechanism, there is nothing to prevent the spindle motor and disk assembly from freely rotating when not in use. If such a drive is used for an automotive application or other application in which it will experience significant and continuous vibration while the spindle motor is not spinning, damage may result. In such circumstances, the spindle motor and disk assembly may rock back and forth at about the same angular location in response to environmental vibration. This constant rocking motion may cause fretting of the spindle motor bearings. While it is generally known that an automotive environment is stressful for a disk drive, this particular mode of failure and its cause is not necessarily known in the industry.

DETAILED DESCRIPTION

Referring to the Drawing, wherein like numbers denote like parts throughout the several views, FIG. 1 is a simplified drawing of a rotating magnetic disk drive storage device 100, for use in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity. The drive motor (not visible in FIG. 1) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electro-magnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic slider 109 with a read/write transducer 110 is located at the end of each head/suspension assembly 108 adjacent disk surface 102.

In order to protect the disk surface and heads, and to make it easier to start the spindle motor from a dead stop, the slider and transducer head assembly 109 is "unloaded" when the disk drive is not in use, meaning that actuator 105 is rotated away from the center of disk 102 so that a projecting finger 115 at the end of each suspension 108 engages a respective ramp surface of ramp assembly 116, lifting the slider 109 away from the disk surface 102. The ramp and engaging finger are simply an example of one mechanism for unloading a transducer head, it being understood that other mechanisms are possible.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
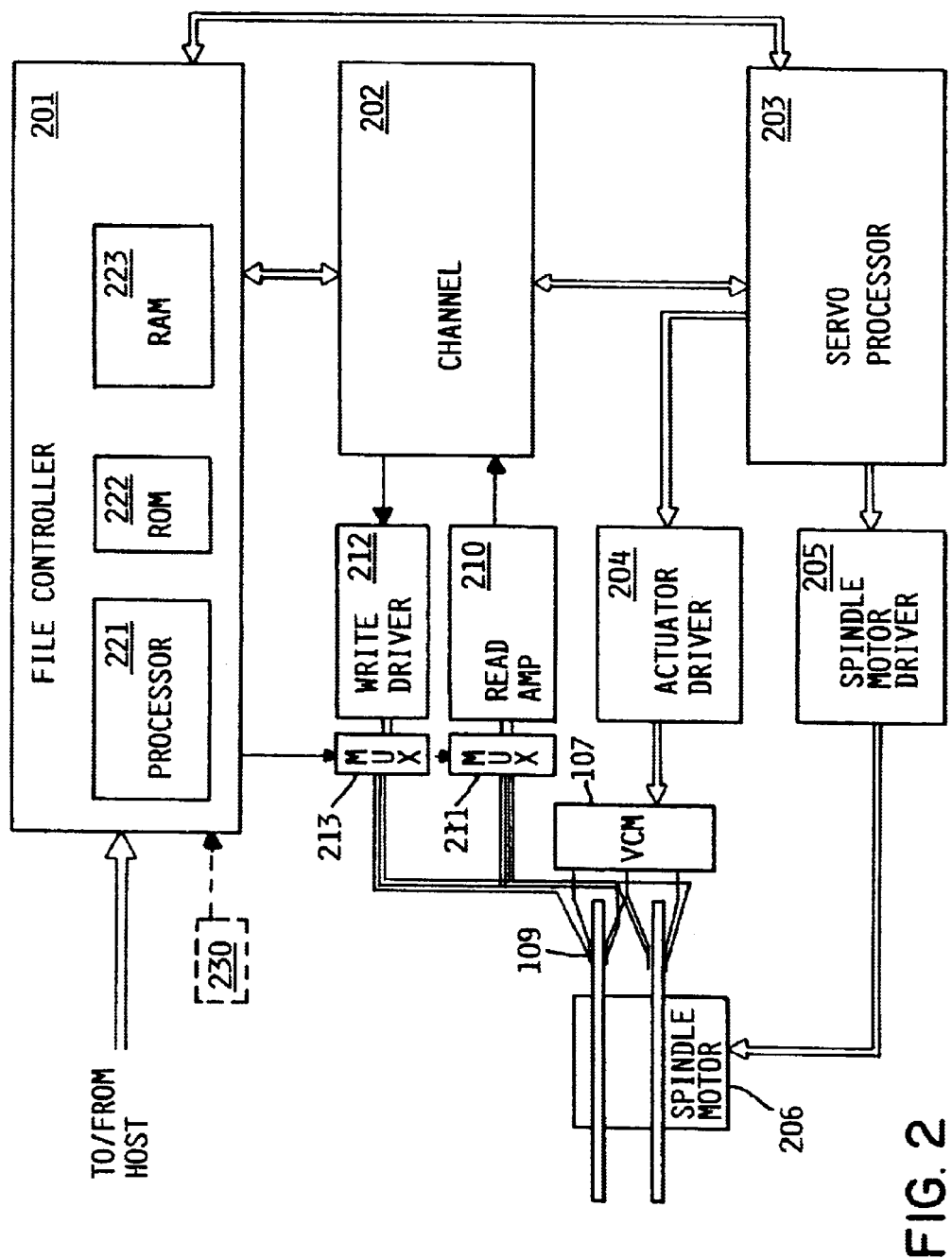
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host. For a conventional application, a "host" is a computer system such as a desktop computer system or a mainframe computer system. In the case of an automotive application envisioned herein, the "host" is an on-board processor/controller of the automobile, which, as pointed out above, is in fact a small computer system.. Controller 201 also provides general control of the operation of disk drive 100, including such functions as command interpretation, sector mapping, power-up routines, diagnostics, etc. File controller 201 also provides a soft error recovery routine for recovering from soft errors. Channel electronics 202 provides modulation and demodulation function for data being written to and read from the disk surface. Servo processor 203 interprets servo signals obtained from reading servo patterns on the disk to control the actuator and spindle motors; it also responds to seek signals from file controller 201. Servo processor 203 determines the necessary parameters for actuator motor and spindle motor, and provides these as inputs to actuator motor drive circuitry 204 and spindle motor drive circuitry 205. Actuator motor drive circuitry 204 in turn provides drive current to actuator voice coil motor (VCM) 107, positioning actuator 105 to a desired location. Spindle motor drive circuitry 205 provides drive current to spindle motor 206, driving the motor at a desired rotational velocity.

Transducers 110 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signal 214 from file controller 201. Magnetic patterns representing data or servo signals are sensed by magneto-resistive read elements in transducers 110, amplified by read amp 210, and provided to channel electronics 202. Channel electronics preferably includes a partial-response maximum likelihood (PRML) filter for decoding data signals into coherent data for use by a host system. When writing data, channel electronics 202 encodes data according to a pre-determined encoding format, and provides this data to write driver 212, which in turn drives current through an inductive write element to cause the data to be written on the disk surface.

Positioning of transducers 110 is achieved by a servo feedback loop system comprising transducers 110, read amp 210, channel electronics 202, servo processor 203, actuator driver 204, and actuator motor 107. Transducers 110 read servo patterns recorded at periodic intervals on disk surfaces 101; these are amplified by read amp 210; the servo patterns are converted to position information by channel electronics 202; position information is interpreted by servo processor 203 to determine an amount of drive current which must be supplied to actuator motor 107; and actuator driver 204 then generates the required drive current in response to a control signal from servo processor 203. Servo processor 203 uses the same information to interpret angular position and provide appropriate control signals to spindle motor driver 205.

File controller 201 preferably includes programmable processor 221 which executes a control program resident in read-only memory (ROM) 222. ROM 222 is a non-volatile semiconductor random access memory, the contents of which are not lost when disk drive 100 is powered down. File controller also includes volatile read/write memory (RAM) 223. RAM 223 is used as a temporary cache for data being read from and written to one or more of the disk surfaces. RAM 223 is also used for storing internal state variables necessary for drive operation.

In an alternative embodiment, file controller 201 is coupled to optional vibration sensor 230 such as an accelerometer, which senses environmental vibration. File controller 201 uses the input from sensor 230 to determine when to engage the spindle motor locking mechanism described herein.

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features. It should further be understood that various electronic components such as file controller 201, channel 202 and servo processor 203 are shown in FIG. 2 for illustrative purposes, and that one or more of these may be combined as a single module, or may be embodied in multiple modules.

Figure 3:
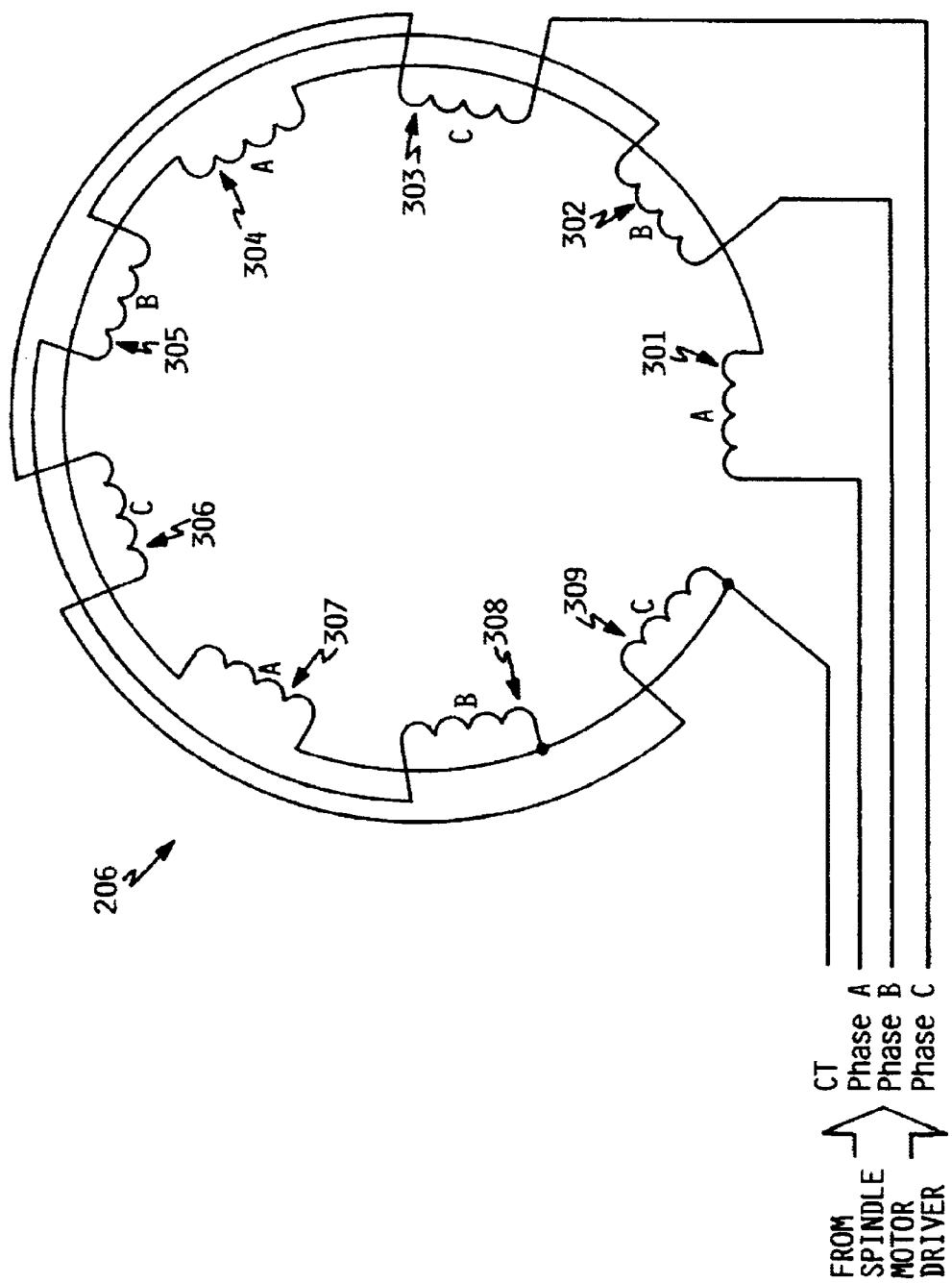
FIG. 3 shows in greater detail the disk drive spindle motor, according to the preferred embodiment.

FIG. 3 shows in greater detail the stator of disk drive spindle motor 206, according to the preferred embodiment. Preferably, spindle motor 206 is a brushless DC motor having an electrically driven stator and a permanent magnet rotor. The stator winding are connected in a 3-phase wye configuration having a central tap, although other numbers of phases or other configurations such as a delta configuration are possible. Preferably, stator windings 301–309 are arranged with three poles per phase connected in series, or a total of nine poles, although the number of poles may vary. The three phases of the stator windings are driven by respective drive transistors in spindle motor driver 205. As shown in FIG. 3, all poles of a given phase are driven by a common drive current on the associated phase line, e.g., poles 301, 304 and 307 are connected in series and driven by phase line A. However, it would alternatively be possible to provide separate drive transistors for the different poles of the same phase.

During normal operation, servo processor 203 determines the current angular position of the disk by any of various means, such as sensing back EMF, or from position information read by a read transducer and decoded by channel 202. From this information, it determines the magnitude(s) and phase(s) of drive current required to drive the stator, and inputs these parameters to spindle motor driver 205, which then generates the required currents.

It should be understood that FIG. 3 is intended to represent a typical disk drive spindle motor configuration. The specific configuration of phases, poles, and other matters is not critical to the present invention. A disk constraining mechanism as described herein could be used in a disk drive having any of various spindle motor configurations.

In the preferred embodiment, a control program executing in processor 221 of file controller 201 controls the operation of disk drive 100 to engage a disk constraining mechanism when the disk is not operating yet environmental vibration is present. Specifically, the preferred disk constraining mechanism is to lock the disk using the existing spindle motor. This process is shown at a high level in FIG. 4.

Figure 4:
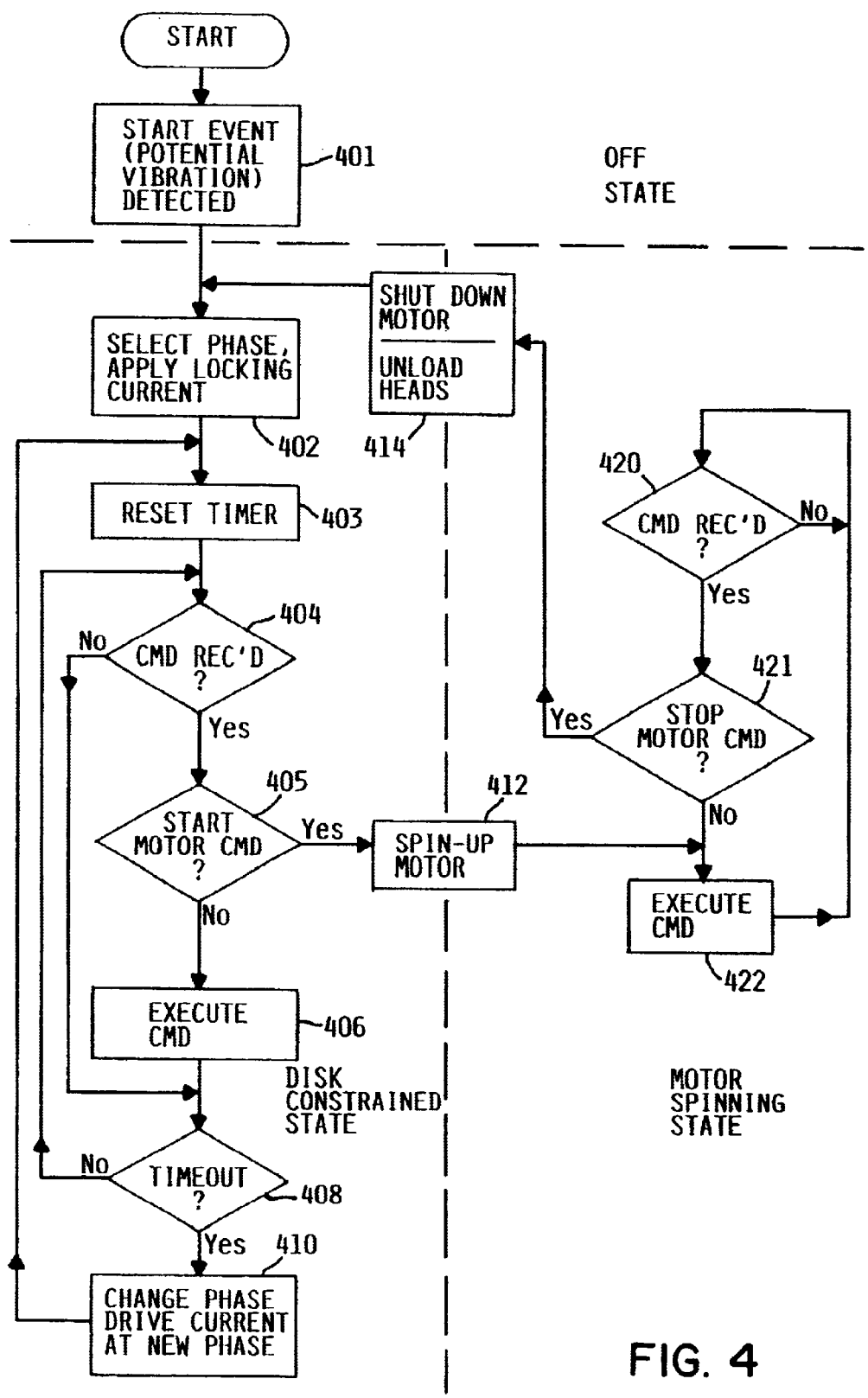
FIG. 4 is a high level flow diagram of the process of operating a disk drive storage device, according to the preferred embodiment.

As shown in FIG. 4, disk drive 100 is initially in an off state. In the "off" state, the transducer heads are unloaded on unload ramp 116, and no power is applied to the spindle motor. Drive 100 exits the off state upon the occurrence of a power-on event (block 401). This may occur in one of several ways. Drive 100 may be completely without power, i.e., truly "off", in which case it exits the off state (exits block 401) upon power being applied from an external source such as an ignition switch, causing controller 201 to power-up and a control program to begin execution in processor 221. Alternatively, external power may be applied to the drive at all times, but controller 201 may interrupt power to the spindle motor, channel and other electronics; in this alternative, processor 221 waits in an idle loop for some external command, interrupt, or similar event to exit from block 401. For example, the vehicle's on-board computer, acting as a host system, upon detecting an appropriate event (such as the ignition switch being turned on, or vibration being sensed), will send a command to drive 100. In a second alternative, if drive 100 is equipped with optional vibration sensor 230, external power is applied at all times and processor 221 waits in an idle loop at block 401 as stated above, until vibration is detected from sensor 230, at which time it exits block 401.

Upon exiting block 401, the drive enters a disk constraining state in which the disk is to be constrained to avoid damage due to free movement in the presence of prolonged vibration. Controller 201 selects an initial motor phase for locking the disk and causes a drive current to be applied to the selected phase to prevent angular motion of the disk (step 402). This initial phase can be selected to always be the same initial phase, or it can be selected on a round-robin basis, random basis, or some other basis. Preferably, controller 201 causes drive current to be applied by issuing appropriate commands to servo processor 203, which recognizes such commands as lock commands and drives only a single phase to lock the spindle motor in place. Controller 201 then initializes or resets a timer to be used for changing the phase of the locking current (step 403).

Controller 201 then checks for the presence of a command from the host (step 404). If no command is present (the "N" branch from step 404), the controller proceeds to step 408. If a command is present (the "Y" branch from step 404), the controller determines the action necessary (step 405). If the command is of a type requiring that the disk spindle motor begin operation, the "Y" branch is taken from step 405. Typically, this would be a command to spin-up the motor, although depending on the drive design, it could be a data access command such as a read or write, which by implication requires that the motor be spinning. If the command does not require that the motor be spinning (e.g., a status command or similar), the "N" branch is taken from step 405. In this case, the command is handled as appropriate, represented generically in FIG. 4 as step 406. The controller then continues to step 408.

Upon reaching step 408, the controller checks the state of the timer that was reset at step 403. The timer is used to rotate the phase of the disk drive spindle motor to which power is applied. If power is always applied to the same motor phase, the disk will be locked at the same position. Prolonged locking at a single angular position may have undesirable effects. Therefore, in the preferred embodiment, the disk is periodically rotated through a small arc so that the spindle motor will not always be in the same position. The disk is always rotated in the same direction, which is preferably the direction of rotation during normal operation. The length of the timeout is a matter of design choice, although it is not intended that the motor spin at any significant angular velocity. For example, the timeout period may be from several seconds to several minutes. It should be understood that periodic rotation of the disk using a timer is but one embodiment of the present invention, and that it would alternatively be possible to hold the disk at the same position without rotation.

If the timer has not timed out, the controller returns to step 404. If the timer has timed out, then it is time to rotate the disk. In this case, controller 201 increments the spindle motor phase to which electrical current should be applied, which will cause the disk to rotate through an arc to a new position (step 410). In the exemplary embodiment described above having three phases and three poles in each phase, the rotor would be rotated to the next pole position, i.e., through an arc of 40 degrees. The controller then returns to step 403 to reset the timer.

If, at step 405, the command received was of a type requiring that the disk motor be spun up (the "Y" branch), controller 201 then issues appropriate commands to servo processor 203, causing it to stop locking the disk and start rotating the spindle motor (step 412). This causes drive 100 to enter a state in which disks 101 are spinning; this state is indicated by blocks 420–422 in the right portion of FIG. 4

After spinning up the motor to the desired speed, the controller then handles the command as required, which is represented generically in FIG. 4 as step 422. Depending on the type of command, this may require that other portions of drive 100, such as channel 202 actuator driver 204, etc. be powered-up and enabled. The controller then continues to step 420.

At step 420, the disk drive waits in an idle loop for a command while the motor is spinning. When a command is received, the "Y" branch is taken from step 420. If the command is of a type which does not require the spindle motor to be stopped (typically, a a data access command), the "N" branch is taken from step 421, and the command is handled as appropriate at step 422. The controller then returns to step 420.

If the command received requires that the motor be stopped ("Y" branch from step 421), the controller causes servo processor 203 to stop the motor (step 414). The heads are unloaded at the same time to prevent the heads from landing on the disk surface. The motor may be braked, or may simply be allowed to coast to a stop.

After stopping the spindle motor, the disk drive enters the disk constrained state. The controller proceeds to step 402, where the motor is locked as described above.

FIG. 4 does not depict a return to the "off" state. Depending on the disk drive design this may occur as a result of interrupting the external power, or may occur in response to a command from a host. Either depends on external events which could occur at any time. Upon return to the off state, the disk heads are unloaded (if they have not already been unloaded), and the drive is powered-down. In the preferred embodiment, constraining force is not applied to the disk in the off state.

It will be understood that disk drive operations unrelated to the disk constraining mechanism have been depicted in FIG. 4 at a very high level of abstraction. In fact, a typical disk drive responds to many different types of commands; responsive behavior may be very complex; and exchange of information with the host may require many steps. Furthermore, under certain circumstances and in certain designs, a disk drive may itself initiate a communication with its host. These details have been omitted from the description herein for clarity of illustration.

In the preferred embodiment described above, the disk and spindle motor assembly are constrained by applying an electric current to at least one pole of the spindle motor stator. This means for constraining the spindle motor has several advantages. It requires little or no additional hardware, since it uses the spindle motor and spindle motor drive electronics which are already present in a typical disk drive. Thus, it may be possible to enable a disk constraining mechanism in accordance with the present invention merely by making appropriate modifications to the control program executing in processor 221, although, depending on the design, it is also possible that some additional hardware may be required. This preferred design also makes it easy to periodically rotate the disk to a new angular position, in order to avoid possible adverse effects from constraining the disk in the same place for a prolonged period.

However, it would alternatively be possible to use other constraining means in order to protect the disk in the presence of vibration. In particular, it would be possible to use any of various mechanical constraining members. An example of such an alternative mechanical constraining system, although by no means the only such system, is depicted in FIG. 5.

Figure 5:
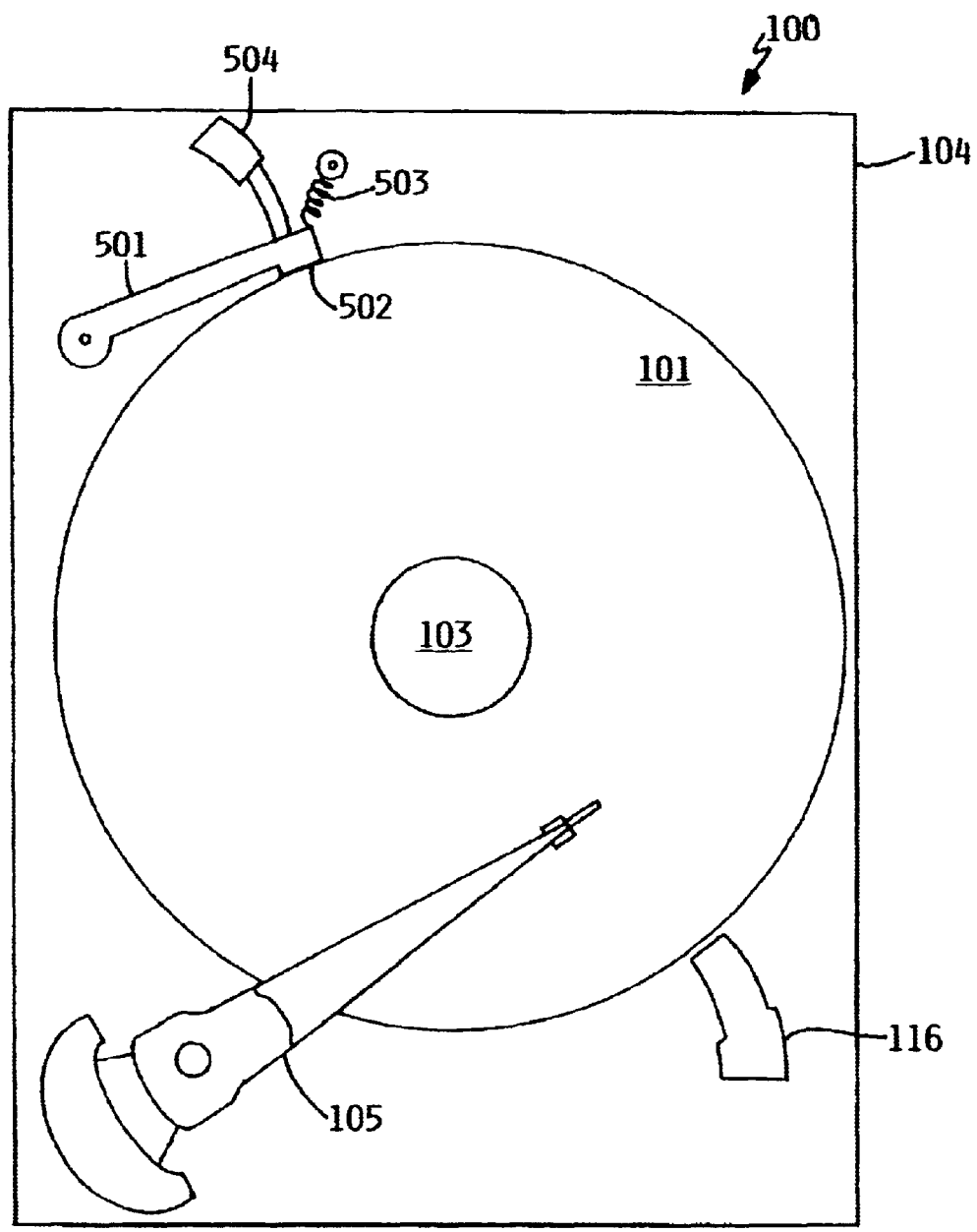
FIG. 5 illustrates an example of a mechanical braking arm for constraining a disk of a disk drive storage device, according to an alternative embodiment.

As shown in FIG. 5, a disk may be mechanically constrained by an elongated arm 501 which is pivotably attached near one end to frame 104, and which contains a braking surface 502 at the other end. A compression spring 503 is also attached at one end to frame 104, and at the other to arm 501, as shown. Solenoid 504 moves arm 501 through a short arc to place it either in contact with disk 101, in which case the disk is constrained, or away from disk 101, in which case disk 101 is free to move. Spring 503 applies a force to hold arm 501 in either the braking position or the free position. Because constraining force is applied by spring 503, solenoid 504 consumes power only when the constraining arm is being moved from one position to the other.

In the preferred embodiment, the disk drive storage device is installed in a motor vehicle. However, a vibration protection mechanism in a disk drive as described herein would be potentially useful in any number of environments other than motor vehicle applications. The application to motor vehicles should be understood as but one exemplary application, and not necessarily the only application to which such a disk drive may be put.

In the preferred embodiment described above, the disk and spindle motor assembly are constrained only some of the time when not operational. Specifically, it is anticipated that in a motor vehicle environment, if the vehicle's engine is turned off and the vehicle is not in use, there will be very little harmful vibration. In this case, it is acceptable to allow the disk to be unconstrained, for purposes of conserving electrical power. However, in an alternative embodiment, it would be possible to simply constrain the disk at all times when the drive is not operational (i.e., at all times when the disk is not spinning). This alternative may be feasible in an automobile, depending on the amount of current drain and capacity of the vehicle battery. There may be other installations in which such an alternative is desirable because power conservation is not a significant consideration. For example, if the disk were installed in a ship which generates its own electrical power along with considerable vibration, the alternative of constraining the disk at all times when not in use may be desirable. If mechanical constraining means are used, these would typically be engaged at all times when the disk is not spinning (since such constraining means do not consume stand-by electrical power).

In the preferred embodiment, the disk drive is described as containing a head load/unload mechanism. In general, the problem of free rotation in the presence of vibration is more acute when heads are unloaded. Where heads are instead parked on a portion of the disk surface, the heads themselves typically provide some constraining force, which is often sufficient to prevent any free rotation of the disks, and making a separate disk constraining mechanism unnecessary. However, a separate disk constraining mechanism in accordance with the present invention could be employed in a disk drive without a head load/unload mechanism, i.e., one in which the heads are parked on the disk surface, in order to provide additional constraining force where the constraining force provided by the heads themselves is insufficient.

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as disk surface 102, in FIG. 2 as ROM 222.

While a rotating rigid magnetic disk drive is used in the preferred embodiment, the constraining mechanisms as described herein could be used in other types of disk drives which include a motor and bearings for rotating one or more disks, such as optical drives.

Although a specific embodiment of the invention has been disclosed along with certain alternatives, it will be recognized by those skilled in the art that additional variations in form and detail may be made within the scope of the following claims.

What is claimed is:

1. A rotating magnetic disk drive data storage device, comprising:
   a disk drive base;
   a rotatably mounted disk and spindle assembly, said disk and spindle assembly comprising at least one rigid disk for recording magnetically encoded data on at least one surface of said at least one rigid disk, said at least one disk being permanently mounted on said disk and spindle assembly;
   a spindle motor rotating said at least one rotatably mounted disk and spindle assembly;
   a movable actuator supporting at least one transducer head, said actuator positioning said at least one transducer head to access said magnetically encoded data on said at least one surface of said at least one rotatably mounted disk; and
   a disk constraining mechanism operable to constrain said disk and spindle assembly from rotating at least some of the time when said disk drive data storage device is not operational;
   wherein said disk constraining mechanism comprises control electronics providing drive current to at least one of pole of said spindle motor to hold said disk and spindle assembly in place.

2. The rotating magnetic disk drive data storage device of claim 1, wherein:
   said spindle motor comprises an electromagnetic stator having a plurality of poles arranged in a plurality of phases, and a permanent magnet rotor.

3. The rotating magnetic disk drive data storage device of claim 1, further comprising a vibration sensor capable of sensing external vibration, wherein said disk constraining mechanism operates in response to vibration sensed by said vibration sensor.

4. The rotating magnetic disk drive data storage device of claim 1, wherein said disk constraining mechanism operates less than all of the time when said at least one transducer head is unloaded by said head unload mechanism and said disk drive data storage device is not operational.

5. The rotating magnetic disk drive data storage device of claim 4, wherein said disk constraining mechanism operates in response to an external event likely to cause vibration.

6. The rotating magnetic disk drive data storage device of claim 1, further comprising a head load/unload mechanism unloading said at least one transducer head when said disk drive data storage device is not operational.

7. A method of operating a rotating disk drive data storage device, said disk drive data storage device having at least one disk rigidly attached to a common disk and spindle assembly, said method comprising the steps of:
   detecting potential environmental vibration when said disk and spindle assembly is not in a spinning state; and
   responsive to detecting potential environmental vibration, driving electric current in at least one pole of a spindle motor of said disk drive data storage device to prevent motion of said disk and spindle assembly.

8. The method of operating a rotating disk drive data storage device of claim 7, wherein said step of detecting potential environmental vibration comprises receiving a communication from a host computer system.

9. The method of operating a rotating disk drive data storage device of claim 7, wherein said step of detecting potential environmental vibration comprises receiving electrical power from an external source, said electrical power coinciding with a condition of potential vibration.

10. The method of operating a rotating disk drive data storage device of claim 7, wherein said data storage device is a rotating magnetic rigid disk drive.

11. The method of operating a rotating disk drive data storage device of claim 10, wherein said data storage device comprises a head unload mechanism for lifting at least one magnetic transducer head away from at least one recording surface.

12. The method of operating a rotating disk drive data storage device of claim 7, wherein said data storage device is installed in a motor vehicle.

13. The method of operating a rotating disk drive data storage device of claim 12, wherein said step of detecting potential environmental vibration comprises detecting that an ignition switch of said motor vehicle has been activated.

14. A program product for controlling the operation of a disk drive data storage device, said disk drive data storage device having at least one disk rigidly attached to a common disk and spindle assembly, said program product comprising:
   a plurality of processor executable instructions recorded on signal-bearing media, wherein said instructions, when executed by at least one programmable processor of said disk drive data storage device, cause the device to perform the steps of:
   detecting potential environmental vibration when said disk and spindle assembly is not in a spinning state; and
   responsive to detecting potential environmental vibration, driving electric current in at least one pole of a spindle motor of said disk drive data storage device to prevent motion of said disk and spindle assembly.

15. The program product for controlling the operation of a disk drive data storage device of claim 14, wherein said step of detecting potential environmental vibration comprises receiving a communication from a host computer system.

16. The program product for controlling the operation of a disk drive data storage device of claim 14, wherein said step of detecting potential environmental vibration comprises receiving electrical power from an external source, said electrical power coinciding with a condition of potential vibration.

17. The program product for controlling the operation of a disk drive data storage device of claim 14, wherein said data storage device is a rotating magnetic rigid disk drive.

* * * * *